Sept. 17, 1963   J. B. DRAPEAU, JR   3,103,919
POSITIVE DISPLACEMENT INTERNAL COMBUSTION ENGINE
Filed April 6, 1961   4 Sheets-Sheet 1
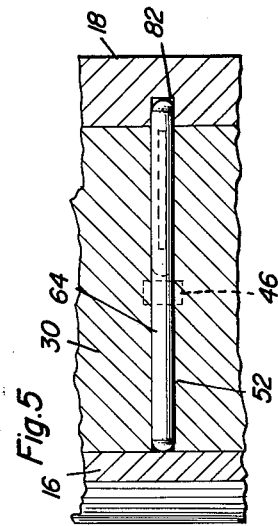
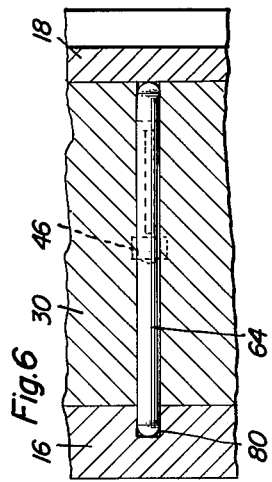
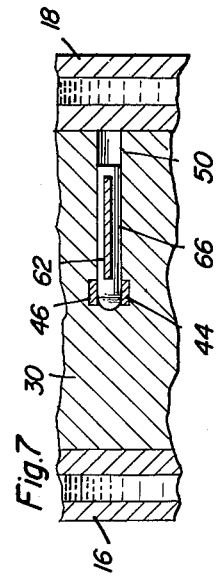
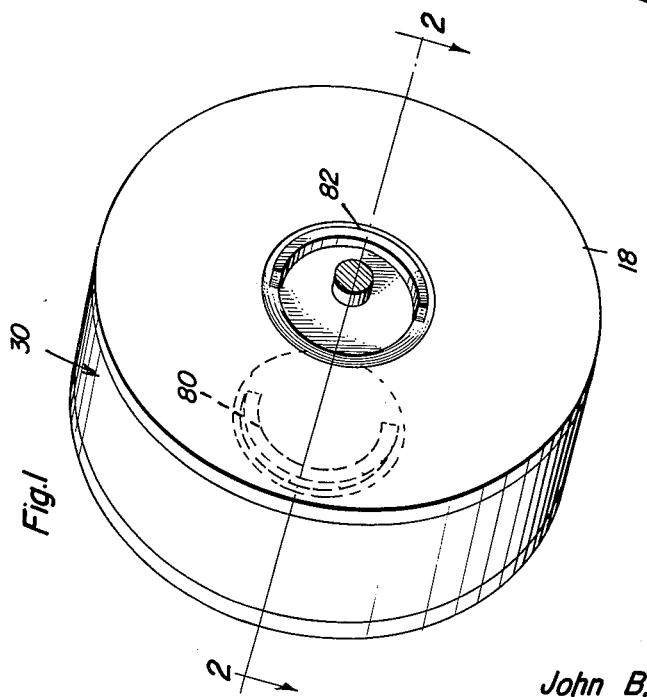
John B. Drapeau, Jr.
INVENTOR.

Sept. 17, 1963  J. B. DRAPEAU, JR  3,103,919
POSITIVE DISPLACEMENT INTERNAL COMBUSTION ENGINE
Filed April 6, 1961  4 Sheets-Sheet 2
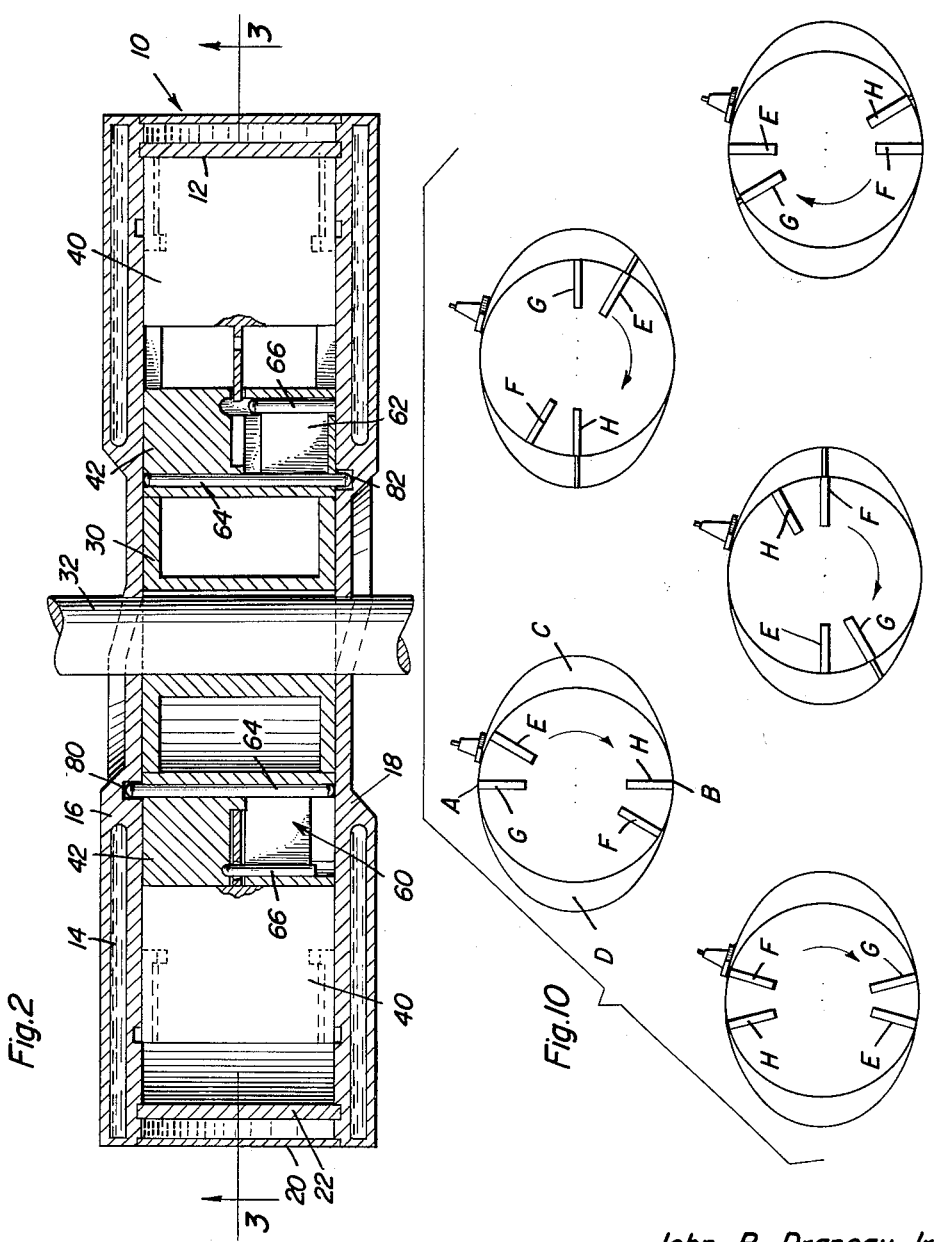
John B. Drapeau, Jr.
INVENTOR.

John B. Drapeau, Jr.
INVENTOR.

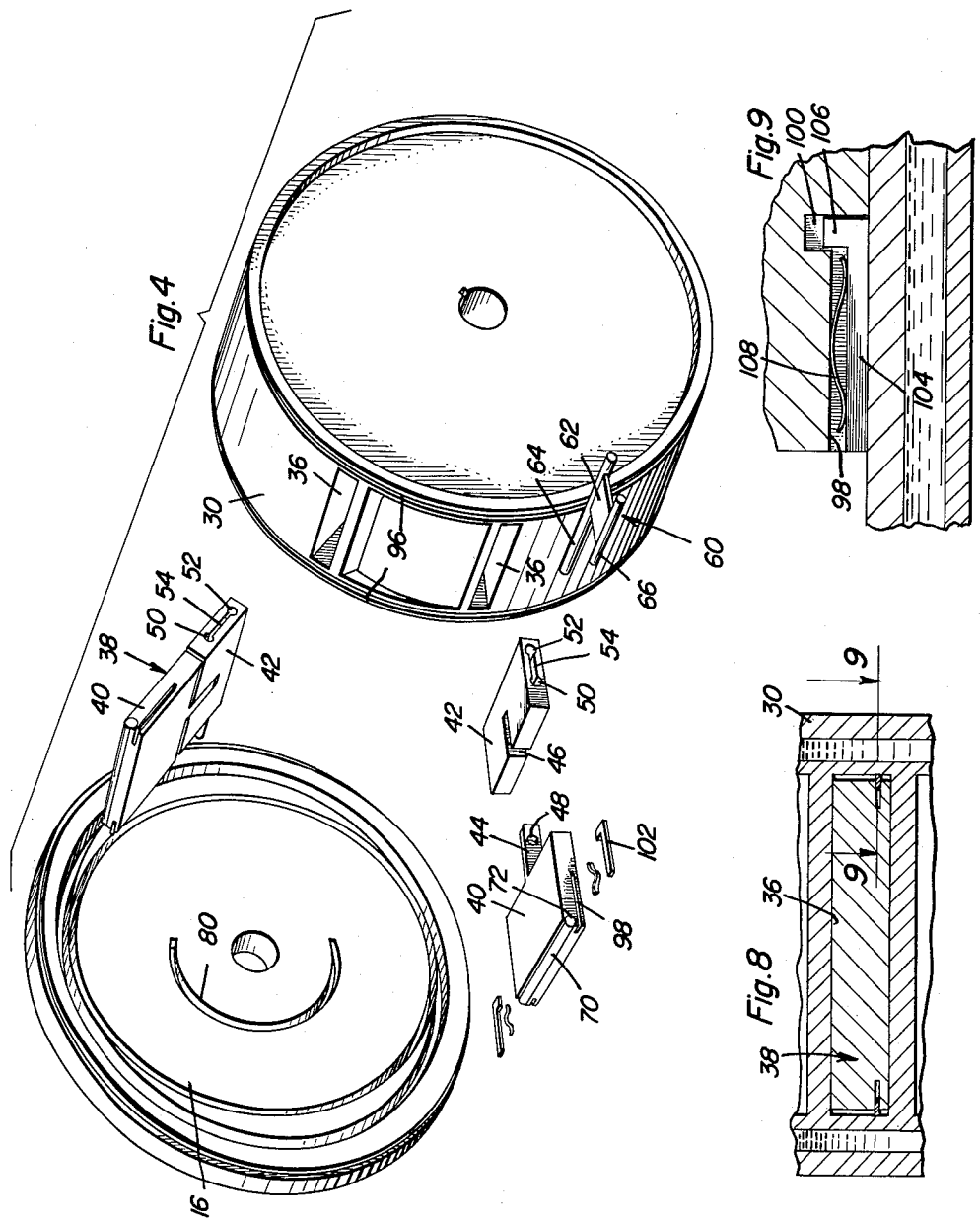

_United States Patent Office_ 3,103,919
Patented Sept. 17, 1963

3,103,919
POSITIVE DISPLACEMENT INTERNAL COMBUSTION ENGINE
John B. Drapeau, Jr., 314 Lawton St., Fall River, Mass.
Filed Apr. 6, 1961, Ser. No. 101,269
15 Claims. (Cl. 123—16)

This invention comprises a novel and useful positive displacement internal combustion engine and more particularly relates to an engine of the rotating piston type having radially slidable vanes extending from a rotor to the internal wall of a stator to define therewith the working chambers of the engine.

The primary object of this invention is to provide an engine which will combine the power and simplicity of structure and operation of a turbine with the economy and positive displacement characteristics of an internal combustion engine.

A further object of the invention is to provide an engine which will attain with an assembly of four vanes in an elliptical working chamber two power impulses per revolution of the rotor.

A still further object of the invention is to provide a device which will increase the structural strength, eliminate shocks and jars of reversing parts by substituting therefor a continuous rotation of the piston element for the reciprocating masses usually encountered in internal combustion engines.

Still another object of the invention is to increase the power of the engine by obtaining the maximum lever arm through which the working thrust is applied to the rotor of the engine by applying the working thrust at the maximum distance from the center of rotation permitted by the dimensions of the engine.

Still another object of the invention is to improve the performance of a rotary piston internal combustion engine of the vane type by providing two sets of alternately operating vanes with one set functioning solely as intake and compression vanes and the other set functioning solely as power and exhaust vanes, together with actuating means rendering the two sets of vanes sequentially operable and inoperable.

Yet another purpose of the invention is to provide a bypass construction for transferring the charge compressed by the compression vanes into the working space defined by the power vanes.

A still further object of the invention is to provide an effective fluid tight seal between the radially sliding vanes, the rotor and the stator of the engine.

A still further object of the invention is to provide an engine in which the volumetric efficiency of the same will be improved by obtaining the minimum back pressure on the exhaust of the engine and the minimum restriction on the intake of fuel thereinto, through the lengthening of the intake and exhaust functions throughout 180° of the rotation of the engine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a suitable embodiment of internal combustion engine in accordance with the principles of this invention, certain concealed parts being shown in dotted lines therein;

FIGURE 2 is a horizontal sectional view taken upon an enlarged scale substantially upon the plane indicated by the section line 2—2 of FIGURE 1;

FIGURE 4 is an exploded perspective view of certain of the components of the engine;

FIGURES 5-7 are detail views in transverse section of the vane actuating means of the invention;

FIGURE 8 is a detail view in transverse section showing the slidable vane and the vane recess of the rotor of the engine;

FIGURE 9 is a detail view in horizontal section taken substantially upon the plane indicated by the section line 9—9 of FIGURE 8, but upon an enlarged scale and showing certain details of the vane sealing elements; and FIGURE 10 is a diagrammatic view illustrating the sequence of operations performed by the rotor and vane construction throughout a complete revolution of the rotor.

Figure 3:
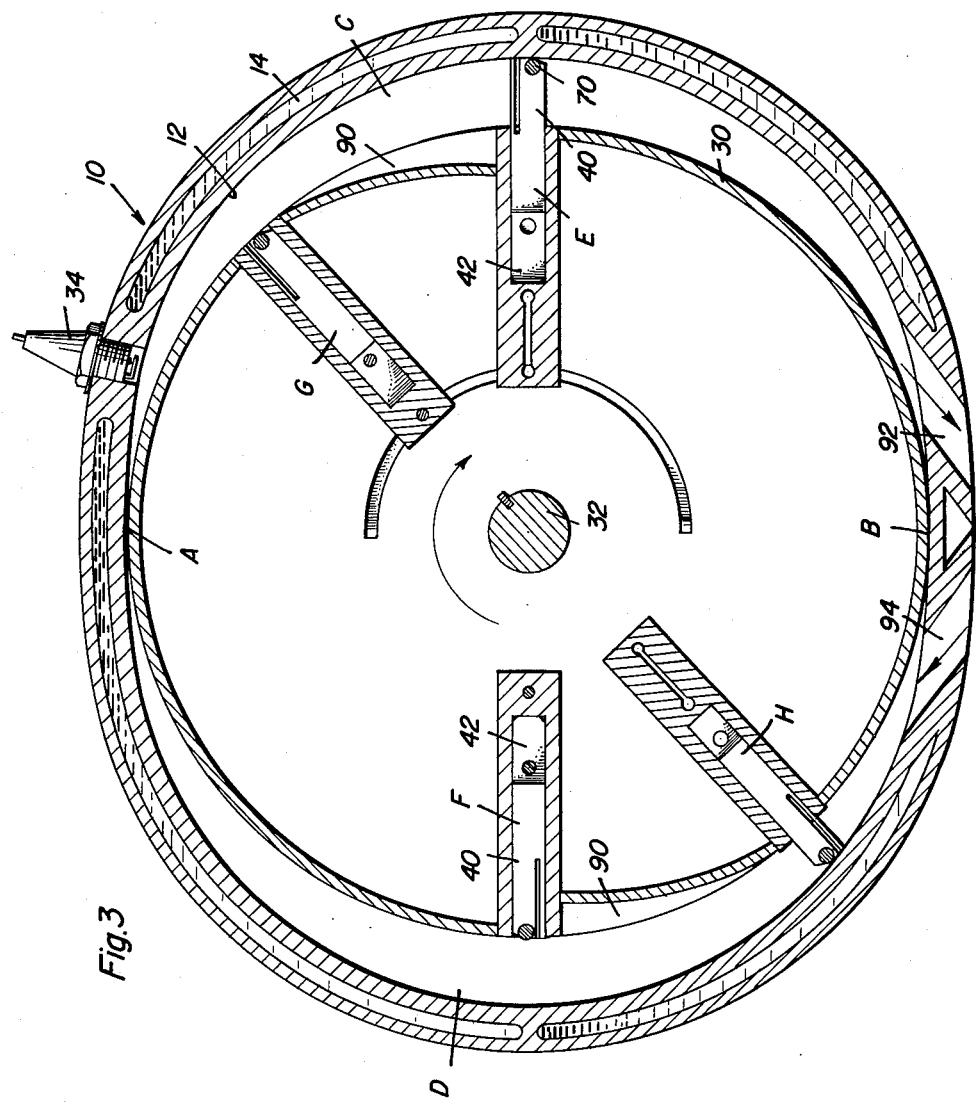
FIGURE 3 is a vertical transverse sectional view taken substantially upon the plane indicated by the section line 3—3 of FIGURE 2.

In the embodiment of the invention illustrated in the accompanying drawings, the numeral 10 designates a stator consisting of a cylindrical or drum-like casing having an elliptical shaped inner wall or surface 12 and which may be water jacketed as at 14 if desired. Conveniently, as shown in FIGURE 2, the stator is formed by a pair of circular end plates 16 and 18 with radially spaced cylindrical plates 20 and 22 secured therebetween and defining the water jacketing 14. As previously mentioned, the working chamber is elliptical in cross section as shown at 12 and there is rotatably received within this space a cylindrical rotor 30 which is fixedly secured to, supported by and is rotatable with an axle or shaft 32 which extends through the end walls, is suitably journalled therein and which may constitute the power take-off shaft of the engine.

The rotor is disposed such that its circumference is tangent to the working chamber wall 12 at diametrically opposite portions thereof, as at the top and bottom of the engine at the positions indicated at A and B, respectively, in FIGURE 3. Owing to the elliptical shape of the working chamber, there are thus provided two crescent shaped working chambers at C and D each extending throughout one-half of the circumference of the stator chamber between the positions A and B. Extending through the peripheral wall of the stator is an ignition device such as a spark plug 34, it being understood that any desired and suitable means for effecting ignition of an explosive charge in the working chamber may be provided.

Inasmuch as the details of the ignition system are not essential to the invention as disclosed and claimed herein, and since the construction and operation of ignition systems for engines are well understood by those skilled in the art, a further description has been omitted as being superfluous and unnecessary.

In carrying out the intent of this invention the rotor 30, as will be best understood by a comparison of FIGURES 3, 4, 8 and 9, is provided with sets of diametrically oppositely disposed radially extending recesses or pockets 36 which open upon the periphery of the rotor. In the simplest form of the invention two such sets of pockets are provided the diameters through these two sets lying at an acute angle to each other as will be readily apparent from a consideration of FIGURES 3 and 10. Slidably received in each of these recesses is a blade or vane which is indicated generally by the numeral 38. As will be more clearly apparent from FIGURE 4, the vane 38 includes an outer plate-like member 40 together with an inner plate-like member 42. The adjacent edges of these members are provided with a detachable pin and groove connection consisting of a stem 44 carried by the member 40 which is slidably received in a slot 46 carried by the member 42.

A locking means is provided for selectively and at properly timed relation locking the two vane sections 40 and 42 in a rigid or fixed relation to each other to function as a unit and to release the same whereby they may move independently for a purpose to be subsequently set forth. This locking means consists of an aperture 48 formed in the stem 44 of the section 40 together with a pair of apertures 50 and 52 disposed in parallel relation in the section 42 and extending transversely thereof. The bore 50 extends from one side of the section 42, and terminates in this section at the other side of the slot 46, while the bore 52 extends entirely through the section 42. A slot 54 connects the bores 50 and 52 to receive therein a locking key.

The locking key, indicated generally by the numeral 60, as shown in FIGURES 2 and 4 consists of a flat plate-like body 62 slidable in the slot 54, together with a pair of pins 64 and 66 rigidly secured to opposite edges of the body 62. The pin 66 is received and slides in the bore 50, while the pin 64 is slidably received in the bore 52. The pin 66 is so dimensioned that its inward extremity may slide across the slot 46 and engage in or disengage from the locking aperture 48 of the vane section 40. The pin 64, on the other hand, is of slightly greater length than the section 42 so that as the locking key is shifted transversely of the vane assembly, the opposite ends of this pin in alternation are projected beyond the corresponding side surfaces of the rotor 30. The pin 64 thus constitutes an actuating member for the locking key, while the pin 66 constitutes the locking pin therefor.

Considering now FIGURE 2 in greater detail it will be noted that the locking pin is shown at the left side of this figure as in the locked position whereby the vane section 40 is locked to and fixedly secured to and moves with the vane section 42. On the right hand side of FIGURE 2, it will be noted that the locking key is disengaged so that the locking pin 66 is now withdrawn from the aperture of the stem of the vane section 40 whereby the vane section 40 is free to move radially in its recess in the rotor with respect to the inner vane section 42.

It will be understood that centrifugal force normally will urge the vanes 38 radially outwardly with respect to the rotor. However, the actuating pin 64 and the inner vane section 42 retain a fixed position with respect to the axis of rotation. When the outer vane section 40 is in retracted position, its locking aperture 48 in its stem 44 will register with the bore 50 so that the locking pin 66 may engage therein as shown at the left side of FIGURE 2 and thus rigidly lock the outer vane section in retracted position. At this time, the radially outer edge of the vane section 40 is substantially flush with or may be slightly recessed within the cylindrical periphery of the rotor. However, when the locking pin is disengaged as shown at the right hand side of FIGURE 2, centrifugal force is free to move the outer section 40 radially outwardly from the inner section 42 so that the outer edge of the vane section may slide upon and have a fluid tight sealing engagement with the periphery of the stator.

In order to reduce friction of this sliding engagement, as will be best apparent from FIGURES 3 and 4, the outer edge of the outer vane section 40 upon its leading edge is provided with a cylindrical anti-friction roller 70 retained in a complementary cylindrical groove 72 to thus facilitate sliding action of the vane on the surface 12, minimize wear and improve the sealing properties.

Referring now to FIGURES 5 and 6 in conjunction with FIGURE 2 it will be observed that the end walls or end plates 16 and 18 are provided with semi-circular channels or recesses at 80 and 82, respectively, into which the opposite ends of the actuator pin 64 may be successively projected. To effect this projection, the opposite end walls or plates function as cam means to effect lateral shifting of the actuator pin and thus of the locking key assembly. This shifting motion causes a corresponding shifting of the plate 62 in the slot 54 and a corresponding shifting of the locking pin 66 in the bore 50 so as to selectively engage this pin in the locking aperture 48 of the stem 44 of the vane 40 when this locking aperture is in registration with the bore 50, as shown in FIGURE 7.

The position of the recesses is such as to effect ultimate transverse shifting of the locking key as the latter passes the top and bottom positions A and B, respectively. When the locking pins are engaged, the vane section 40 will be retained in its retracted position and thus be ineffective to operate in the working chambers C or D. On the other hand, when the locking pin is disengaged, centrifugal force is effective to urge the sections 40 outwardly into an operative fluid tight sealed engagement with the wall 12 of the chambers C and D to operate as pistons and thus perform the functions necessary in a cycle of operation of an internal combustion engine.

It has been previously mentioned that there are two sets of diametrically opposed vanes. Although these vanes are of identical construction it is desirable to identify them by different numerals as an aid to describing their operation throughout one complete revolution of the rotor member. Thus, as shown in FIGURES 3 and 10, one set of diametrically opposed vanes is indicated at E and F, while the other set is indicated at G and H. The vanes E and F function solely as power vanes and exhaust vanes, while the vanes G and H function solely as intake and compression vanes. Each set of vanes operates only during one-half of the revolution. Thus, the vanes E and F are advanced and their locking means is released only as they move through the crescent shaped chamber C, while the vanes G and H are released by their locking means and are in their extended operative position only as they move through the crescent shaped chamber D.

The periphery of the rotor is provided with a radially recessed transfer chamber 90 which lies between the vanes G and E and a similar chamber 90 lies between the vanes F and H. The function of these chambers in the operation of the engine will be subsequently set forth.

As shown in FIGURE 3, the stator at its lower position at the station B is provided with a constantly open port or passage 92 constituting an exhaust port and with a further continuously open passage 94 comprising an inlet port by means of which a combustible mixture from any suitable source, not shown, may be delivered into the intake and compression chamber D.

The operation of the engine referring to the sequential diagrammatic views of FIGURE 10 is as follows. In the first position of FIGURE 10, it will be noted that the vane G is at the position A. At this time the transfer passage 90 between the vanes G and E has effected transfer of the compressed charge which was in advance of the vane G in the compression chamber D past the position A and into the working chamber C below the ignition device. As the vanes E and G pass the position A, the vane G has been forced radially inwardly of its recess by engagement with the adjacent peripheral wall of the stator, and the locking key is actuated to now lock this vane in its retracted position. At the same time, as the vane E passes the position A, the locking key for this vane is shifted to release the outer section which now moves out into engagement with the wall 12 of the chamber C in the manner shown in FIGURE 3. Consequently, the compressed charge transferred past the position A to beneath the igniting device will now be fired by the igniter and will expand in the working chamber C driving the rotor in the direction indicated by the arrow therein. In the chamber C in advance of the blade E, the previously ignited charge is being exhausted throughout substantially 180° of travel through the exhaust port 92. At the same time, as the vane H passes the position B, it is released by its locking key and serves to compress the charge previously introduced by the port 94 in advance thereof, in the compression chamber D, and to draw in a charge through the intake port 94 behind itself. The compression intake strokes thus extend likewise throughout 180° of rotation of the rotor.

This operation is continuing as shown in the second sequential view of FIGURE 10 until the position shown in the third view is reached. At this time the actuating means is again rendered operative so that the other vane of each set is now placed into operative position while the previous vane is retracted to its inoperative position and locked therein. During the travel from the fourth to the fifth positions of FIGURE 10 it will be observed that the vane F is now extended and constitutes the power vane, while the vane G is extended and constitutes the compressing and intake vane. This continues until the fifth position of FIGURE 10, at which time the vanes are again shifted and the cycle of operation is again initiated.

From the foregoing, it will be apparent that one set of vanes functions solely as the intake and compression vanes, while the other set functions solely as the power and exhaust vanes. Further, only one vane of each set is operated at one time in its appropriate working chamber, the other vane of each set being held in locked and retracted position. The alternate locking and releasing of the vanes in proper sequence is effected in positions A and B as previously mentioned.

In order to effect a more perfect fluid tight seal between the vanes, the rotor and the stator, it will be observed that the rotor is provided with a pair of peripheral circular sealing rings each indicated at 96. These engage the stator wall in the rotor flange recess. The two sides of the movable vane sections 40 are provided with slots 98 therein having inwardly extending recesses 100 at their inward extremities. L-shaped sealing strips 102 are provided having stem portions 104 and laterally enlarged head portions 106 which respectively engage in the slots 98 and the enlargements 100 as shown in FIGURE 9. Expanders or springs 108 are disposed in the slot 98 behind the portions 104 to yieldingly urge these sealing strips into sealing engagement with the side walls of the vane recesses 36 and end plates 16 and 18 when released and extended in their operative position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary internal combustion engine comprising a stator with an elliptical chamber, a rotor journalled in said stator and having diametrically opposite points of tangency with the peripheral wall of said chamber and dividing the latter into a pair of crescent shaped working chambers, two sets of radially sliding, diametrically opposed vanes on said rotor cooperating with said peripheral wall and defining therewith intake, compression, power and exhaust chambers, means for admitting, igniting and exhausting charges for said working chambers, means for alternately extending the vanes of one set as they pass through one working chamber and for alternately retracting the vanes of the other set when they pass through said one chamber and for extending them when they pass through said other chamber, each vane comprising a radially stationary inner section and a radially movable outer section, means for releasably locking said sections together thereby retaining said outer section in its retracted position, said locking means comprising registering apertures in said sections and a locking pin insertable in said apertures.

2. The combination of claim 1 including locking means for retaining said vanes in retracted position and for releasing said vanes during predetermined portions of the rotation of said rotor.

3. The combination of claim 1 including bypass chambers in the periphery of said rotor cooperating with one point of tangency for transferring a charge compressed in a compression chamber to the preceding power chamber.

4. The combination of claim 1 wherein each of said intake, compression, power and exhaust chambers extends from one point of tangency to the other.

5. The combination of claim 1 including sealing means carried by said vanes.

6. A rotary internal combustion engine comprising a stator with an elliptical chamber, a rotor journalled in said stator and having diametrically opposite points of tangency with the peripheral wall of said chamber and dividing the latter into a pair of crescent shaped working chambers, two sets of radially sliding, diametrically opposed vanes on said rotor cooperating with said peripheral wall and defining therewith intake, compression, power and exhaust chambers, means for admitting, igniting and exhausting charges for said working chambers, means for alternately extending the vanes of one set as they pass through one working chamber and for alternately retracting the vanes of the other set when they pass through said one chamber and for extending them when they pass through said other chamber, each vane comprising a radially stationary inner section and a radially movable outer section, means for releasably locking said sections together thereby retaining said outer section in its retracted position, said locking means comprising registering apertures in said sections and a locking pin insertable in said apertures, an actuator pin connected to said locking pin, means for alternately shifting said actuator pin to alternately engage and disengage said locking pin with said apertures.

7. A rotary internal combustion engine comprising a stator with an elliptical chamber, a rotor journalled in said stator and having diametrically opposite points of tangency with the peripheral wall of said chamber and dividing the latter into a pair of crescent shaped working chambers, two sets of radially sliding, diametrically opposed vanes on said rotor cooperating with said peripheral wall and defining therewith intake, compression, power and exhaust chambers, means for admitting, igniting and exhausting charges for said working chambers, means for alternately extending the vanes of one set as they pass through one working chamber and for alternately retracting the vanes of the other set when they pass through said one chamber and for extending them when they pass through said other chamber, each vane comprising a radially stationary inner section and a radially movable outer section, means for releasably locking said sections together thereby retaining said outer section in its retracted position, said locking means comprising registering apertures in said sections and a locking pin insertable in said apertures, an actuator pin connected to said locking pin, means for alternately shifting said actuator pin to alternately engage and disengage said locking pin with said apertures, said actuating and locking pins being slidably carried by one of said sections.

8. A rotary engine comprising a stator with a chamber therein, a rotor journaled for rotation in said chamber, a plurality of radially sliding, peripherally spaced vanes carried by said rotor and cooperating with the peripheral wall of said chamber for defining working chambers therewith, means in said stator opening into said stator chamber and into said working chambers for admitting and exhausting fluid into and out of said working chambers in timed sequence, each vane comprising a stationary inner section secured to said rotor and a radially outer section slidably journaled in said rotor for alternate extension from and retraction into the periphery of said rotor, means operable periodically during rotation of said rotor for locking said sections together in the retracted position of the outer sections and operable periodically to release the sections whereby centrifugal force will be effective to cause the outer section to sealingly engage the stator chamber peripheral wall, said locking means including registering apertures in said sections and a locking pin movable into and out of engagement in said registering apertures.

9. The combination of claim 8 including actuating means carried by said stator for alternately moving said locking means into and out of locking engagement with said inner and outer sections.

10. The combination of claim 8 including actuating means carried by said stator for alternately moving said locking means into and out of locking engagement with said inner and outer sections, said actuating means comprising cam surfaces on said stator positioned in the path of travel and of each locking means or effecting properly timed shifting of the latter.

11. The combination of claim 8 wherein said locking means includes a member having said locking pin thereon and having an actuating member, actuating means on said stator engageable in properly timed intervals with said actuating member for shifting said pin into and out of locking engagement in said registering apertures.

12. The combination of claim 11 wherein said actuating means comprises cam tracks on opposite sides of said rotor and engaging in sequence the opposite ends of said actuating member.

13. The combination of claim 8 wherein said sections have complementary tongues and slots, said registering apertures being disposed in said tongue and in the other section from said tongue, said locking pin being slidably mounted in said other section, and having an end movable across said slot.

14. The combination of claim 13 including a second pin comprising an actuator pin for said locking pin, means rigidly connecting said actuator and locking pins in parallel relation, one of said sections having a slit slidably receiving said connecting means.

15. The combination of claim 14 wherein each of said sections has a transverse bore intersected by said slit, each actuator and locking pin being slidably disposed each in one of said bores.

References Cited in the file of this patent

UNITED STATES PATENTS

| | | |
|---|---|---|
| 1,309,767 | Morgan | July 5, 1919 |
| 2,062,576 | Johnson | Dec. 1, 1936 |

FOREIGN PATENTS

| | | |
|---|---|---|
| 197,985 | Great Britain | May 22, 1923 |
| 294,226 | Germany | Sept. 23, 1916 |
| 606,011 | France | Feb. 27, 1926 |
| 716,754 | France | Oct. 12, 1931 |
| 1,007,748 | France | Feb. 13, 1952 |
| 1,144,073 | France | Apr. 23, 1957 |